Oct. 14, 1969         J. M. FETTKE         3,472,274
HIGH-PRESSURE RELIEF VALVE
Filed March 28, 1968                                2 Sheets-Sheet 1

Oct. 14, 1969  J. M. FETTKE  3,472,274
HIGH-PRESSURE RELIEF VALVE
Filed March 28, 1968  2 Sheets-Sheet 2

United States Patent Office 3,472,274
Patented Oct. 14, 1969

3,472,274
HIGH-PRESSURE RELIEF VALVE
John M. Fettke, Newtown, Conn., assignor to Gar-Kenyon Instruments, Inc., Brewster, N.Y., a corporation of New York
Filed Mar. 28, 1968, Ser. No. 716,872
Int. Cl. F16k *17/30*
U.S. Cl. 137—469                                12 Claims

ABSTRACT OF THE DISCLOSURE

A high-pressure pop valve having a sealed guide element located in the inlet passage provided with a vent means to the exterior and a compression spring protectively housed in a chamber that isolates it from fluid flow through the valve.

---

The high-pressure relief valve of the present invention relates to a hydraulic relief valve of the poppet type which limits the maximum pressure in a hydraulic system by opening at a predetermined pressure setting and allowing relief flow therethrough to limit the pressure of the system to a predetermined maximum value.

Prior to the present invention it has been conventional to provide such relief valves in a form in which a tubular housing defines by its longitudinal bore a through flow passage. Transverse partition means sub-divides this bore into an inlet section and an outlet section and it has a valve orifice extending therethrough for intercommunication which is circumscribed on the outlet section side by an annular valve seat. A spring biased poppet valve member extends through the valve seat and carries an enlarged head which is biased back to a valve-closing position against the valve seat. A predetermined liquid pressure in the inlet section behind the valve head overcomes the opposed biasing force to lift the valve head from the valve seat for relief of the hydraulic pressure.

In such prior art structures frequently the biasing spring is exposed to turbulent flow of the liquid through the valve unit so that there is liquid turbulence within the spring coils to interfere with reliable valve action. Many of such structures require undesirably large springs so as to provide a high biasing rate in relation to the relatively small size of the flow path provided through the valve unit which in turn demands a high force level at valve cracking or initial opening pressure. Usually the stem structure of the valve member is exposed to the flow of liquid through the valve unit to intervere with reliable valve action. These and other problems of prior art valve structures are efficiently solved by the high pressure relief valve of the present invention.

The Mason et al. U.S. Patent No. 2,884,952 discloses a relief valve structure which, superficially, appears to approach the relief valve structure of the present invention as closely as any of which the applicant is aware. In this Mason et al. valve structure the back end of a piston section of the poppet valve member is exposed to the inlet liquid for application of the pressure thereof directly thereon. The valve structure defines a by-passing passage about the guided piston section of the valve member to an annular chamber defined about the reduced stem section intervening the piston section and the valve head. However, the pressure of the liquid supplied to this chamber has the component of the pressure force impinging upon the back end of the valve head within the area of the valve seat exactly balanced by the opposite pressure applied to the front end of the piston section exposed within this chamber, so that all of the lifting force results from the pressure of the inlet liquid as applied to the exposed back end of the piston section. The annular frusto-conical side of the Mason et al. valve head is of the usual 45° angle type, so that the front end of the chamber about the valve stem converges at a 45° angle and the flat transverse surface surrounding the valve seat and this conical surface of the valve head describe a like 45° angle diverging flow section. Thus, in Mason et al. there is no teaching of a convergent-divergent nozzle configuration which will provide a desirable maximum lifting force to the poppet valve unit with a minimum increase in static pressure rise. In valve structures of the type of which the Mason et al. valve is representative the biasing force of the spring is necessarily equal to the area of the valve seat multiplied by the cracking or initial opening pressure. Further, the biasing spring is located within the path of outlet flow beyond the valve seat to subject it to the influence of turbulence. Also, there is nothing in this Mason et al. valve structure to prevent the successive turns of the helical compression spring from closing on each other as the poppet valve unit is thrust forward by inlet pressure. By permitting the successive turns of the spring to close on or contact each other a non-uniform change in the rate of the biasing force thereof tends to occur to produce an unstable valve performance.

These and other problems are avoided by the relief valve structure of the present invention, which also advantageously assures attainment of additional unique characteristics hereinafter pointed out.

Embodiments of the present invention provide in such a relief valve structure a number of advantageous features. The partition means which extends transversely across the bore of the housing structure sub-divides this bore into an upstream section and a downstream section which are communicated by the valve orifice in the partition. On the downstream side of this valve seat the partition means defines a longitudinally-extending, elongated socket which has an upstream guidance section and an intermediate section intervening the latter and the valve seat with this guidance section closed off at its upstream end by transverse wall means to isolate the interior thereof from the inlet liquid pressure. The poppet valve means includes a stem carrying the valve head on the downstream end thereof with this stem having an upstream piston section reciprocatively mounted by relatively close fit in the socket guidance section. The sidewall of the socket intermediate section is arranged about an intermediate section of the stem that intervenes the piston section thereof and the valve head, and it is spaced annularly therefrom to define an intervening, valved pressure chamber. Ducts or passages extend through the transverse partition means to impose inlet liquid pressure to the downstream end of the valve head which is exposed within the valve seat in the valve-closing position. These inlet ducts or passages extend directly to the valved pressure chamber and by-pass the guidance section of the socket and the valve piston section reciprocatively mounted therein. The area of this valve seat is larger than the area of the front end of the piston section which is exposed in this valved pressure chamber so as to provide a differential of the inlet liquid pressure that is applied to the back of the valve head for lift thereof to the valve-open position.

This transverse partition means embodies structure which defines about the downstream side of the valve seat a tubular nozzle port directly communicating the valve seat to the outlet section. The valve head extends into this tubular nozzle port in its valve-open position with the sidewall of the port and the opposed side surfaces of the valve head being relatively shaped to provide in the valve-open position an intervening annular orifice that has an initial upstream converging section and a following downstream diverging section with the included angle of the latter being in the critical range of from about 5° to about 9° that is characteristic of an efficient diffuser, thereby providing together a convergent-divergent nozzle configuration which reduces turbulence through the valve and positively directs the discharge for a useful purpose hereinafter indicated.

The differential in the effective areas of the valve head exposed in the valve seat and of the head end of the piston section of the poppet valve member exposed in the valved pressure chamber dictates a spring biasing force which is equal to the difference in these areas multiplied by the cracking or initial opening pressure. As a result, the use of a smaller, lower biasing rate spring is permitted.

Embodiments of the present invention further protect the biasing spring from the liquid flow through the valve unit. The biasing spring is isolated from this through flow of liquid by encompassing wall means located within the valve housing means so as effectively to surround the spring. While such biasing spring may be so isolated by mounting it within the socket structure of the partition means preferably this advantageous result is obtained in practical embodiments by sub-dividing the outlet section of the housing bore into an outlet zone immediately adjacent the nozzle port and a head chamber.

In the accomplishment of this desirable feature a supplemental transverse partition means may be mounted advantageously in an axially slidable condition within the housing bore. The slidable action of this supplemental partition means is limited by stop means cooperatively provided within the bore and on the partition means so that the travel of the latter as imposed by the forward thrust of the valve head is limited to a distance less than the spacing of the successive turns of the helical compression spring which is protectively isolated in the head chamber. The head chamber beyond the biasing spring mounted therein is closed off by suitable bore plugging means which preferably is axially translatable to adjust the tension of the spring.

In such a preferred operable embodiment of the present invention this slidable partition means preferably is in the form of a cup having a central area of the back face of its bottom opposed to the forward end of the valve head for transmission of thrust from the latter to the former. This cup desirable serves as a seat for the active end of the biasing spring. The annular sidewall of the cup is provided with a close fit to the wall of the bore of the housing and the rim of this sidewall is opposed to an annular shoulder defined in the housing bore together to serve as stop means for attaining the desired limitation of the forward travel or thrust of the poppet valve member. Preferably the back surface of the cup bottom is stepped so that there is defined about the central area against which poppet valve thrust is applied an annular surface area against which the annular pattern of discharge from between the valve head and the tubular nozzle port is directed to apply lifting force thereto.

In order to limit transfer of thrust from the valve head to this slidable transverse partition means or spring seating cup to the axial direction a captured ball is preferably interposed between the forward end of the valve head and the central portion of this partition means or cup. A similar captured ball is also preferably provided between the central portions of the bore plugging means and the opposed end of a spring abutment against which the far end of the spring bears.

The spaces in the bottom of the guidance section of the socket and the head chamber are desirably vented directly to the exterior of the valve housing. For this purpose, with respect to the bottom space within the socket, an axial bore which extends longitudinally through the poppet valve member may be provided, and in order that the captured ball may not block effectively its exit a diversion channel may be provided in the valve head to communicate this relief bore to the outlet area beyond the tubular nozzle.

Among the objects of the present invention which are effectively attained by embodiments thereof is the utilization of the velocity head imparted by the liquid flow through the valve to provide maximum lifting force to the poppet valve member with a minimum increase in static pressure rise.

Another object of the present invention is to direct the flow of liquid through the open valve smoothly by providing the convergent-divergent nozzle configuration so that the velocity thereof through the divergent section is uniformly decreased to attain a minimum of turbulence and a high recovery of head loss.

An additional object of the invention is to direct impingement of the annular discharge between the valve head and the opposed annular surface of the tubular nozzle port to impingement against the slidable transverse partition means which serves as a seat for the active end of the biasing spring, and to cause thereby a change in the direction of flow through the outlet section to the outlet port as to impose upon this spring seat a maximum lifting force with a minimum increase in pressure, i.e., to convert the dynamic fluid head into useful lifting force.

A further object of the invention is to provide for an immediate increase in the effective opening area at the valve upon valve cracking or initial valve opening by the shape of the annular exterior of the valve head and that of the opposed tubular nozzle port, i.e., the convergent-divergent nozzle configuration.

A still further object of the invention is to assure reliable valve performance by the isolation of the biasing spring and the attainment of a substantially uniform spring biasing action while avoiding undesirable erratic variations or deviations from a substantially linear relation of progressive distortion under load to progressively applied load.

Still another object of the invention is to assure stable, chatter-free operation of the valve by preventing radial spring movement or tilting thereof.

Other objects of the invention will in part be obvious and will in part appear from reference to the following detailed description taken in connection with the acccompanying drawing, wherein like numerals identify similar parts throughout, and in which.

Figure 1:
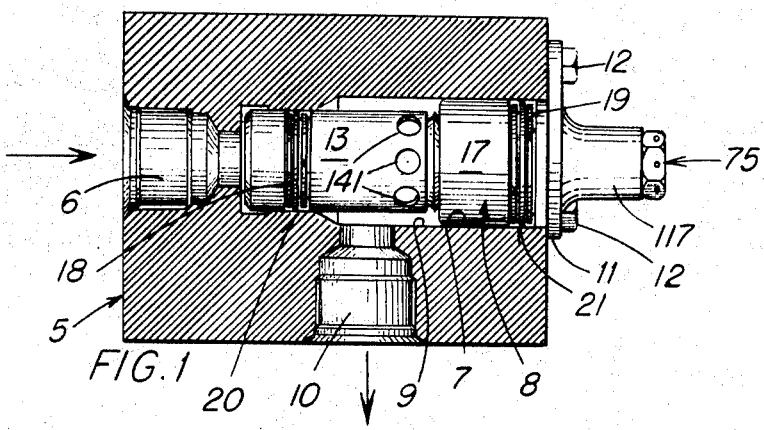
FIG. 1 is an axial section of the casing of a valve assembly, in which is installed an embodiment of the present relief valve of the cartridge type shown in side elevation.
Figure 2:
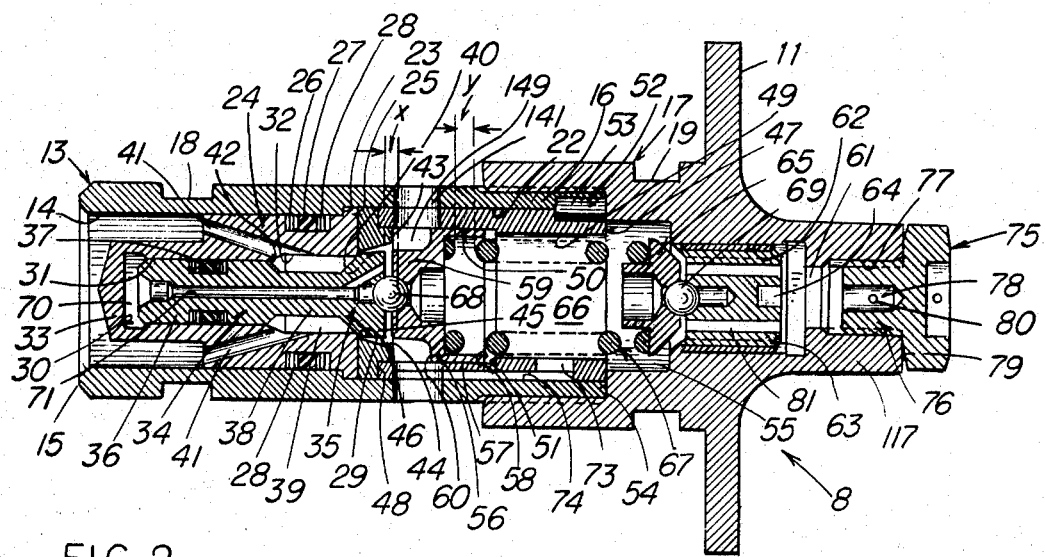
FIG. 2 is an enlarged axial section of the valve unit as installed in the casing structure of FIG. 1, illustrating the relative positions of the internal parts thereof in the valve-closing position.
Figure 3:
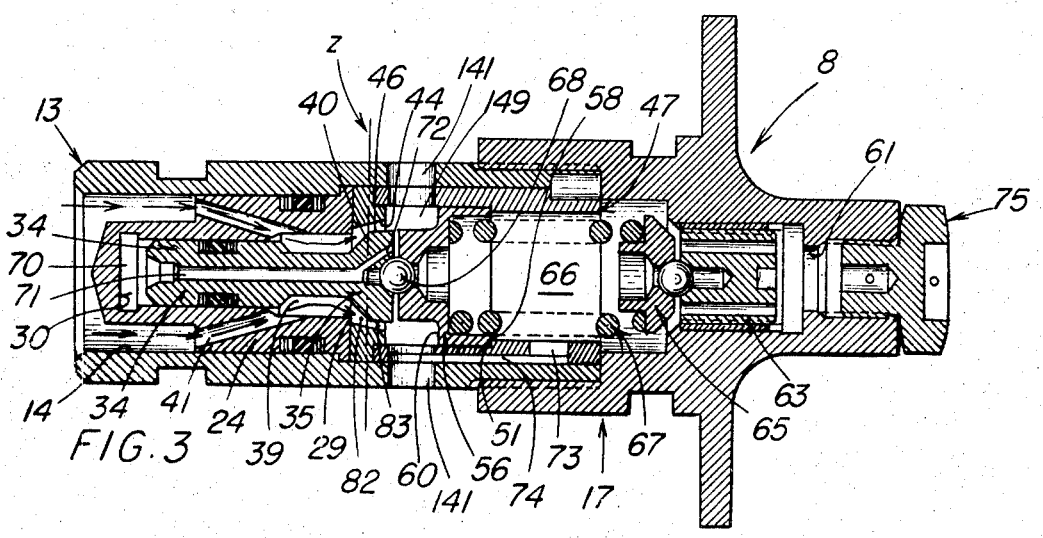
FIG. 3 is an axial section similar to FIG. 2 illustrating the relative positions of the internal parts thereof in the valve-open position.
Figure 4:
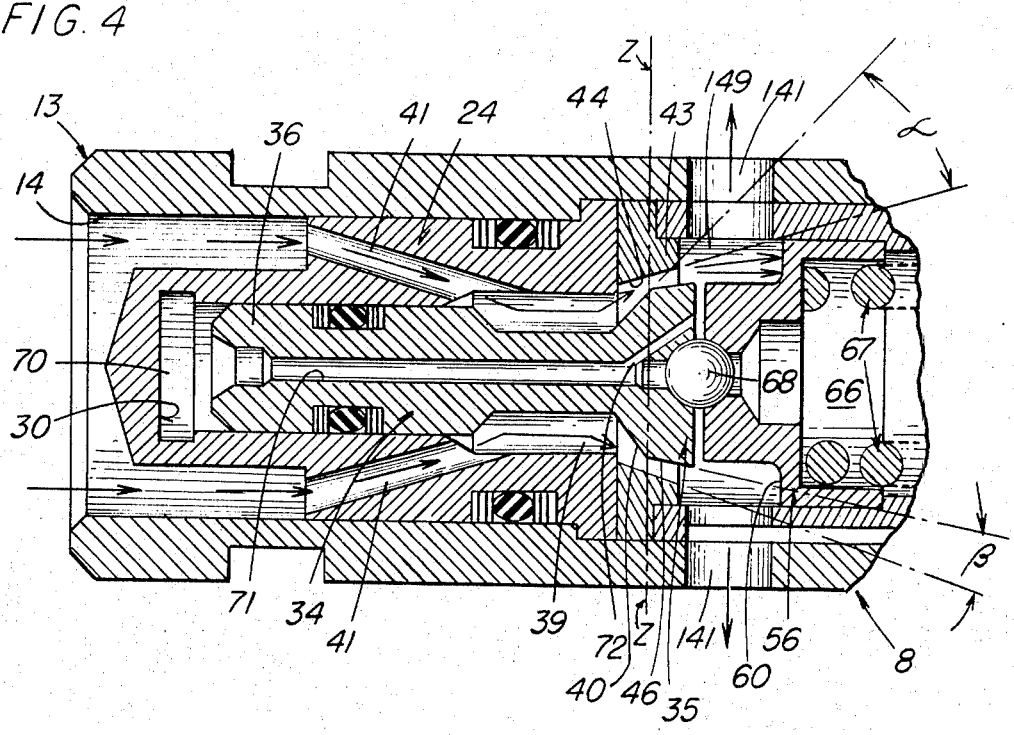
Figure 5:
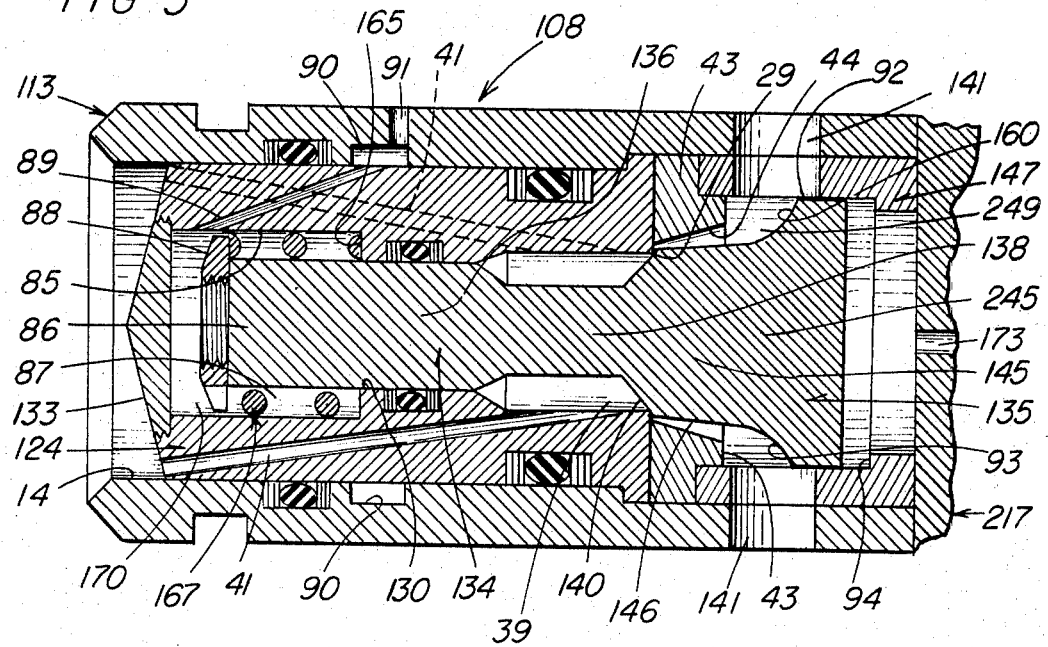

FIG. 4 is a sectional detail to enlarged scale of the structure in the vicinity of the valve elements of the FIGS. 1 to 3 incl. embodiment, showing the valve in open condition for discharge of liquid therethrough; and FIG. 5 is an axial section, with parts broken away, of a modified form of the valve unit shown in FIGS. 1 to 3 incl. to illustrate variations in the biasing spring and its isolation, and the venting of the chamber in which the basing spring is mounted and the space within the valve piston guidance section.

In the embodiment illustrated in FIGS. 1, 2 and 3 a cartridge type of the relief valve of the present invention is depicted, but it will be understood that the present invention may be practiced to advantage in various different external configurations of the valve unit. In FIG. 1 is shown a suitable casing structure 5 which is provided with an inlet passage 6 that may be suitably connected to a high pressure hydraulic system requiring the use of a relief valve, this inlet passage 6 being communicated to a socket or bore 7 in which is telescopically received the valve cartridge unit 8 of the present invention. This bore 7 defines with the exterior of the cartridge unit 8 an annular outlet channel 9 to which is communicated a suitable outelt passage 10 that may be connected in any desired manner to a spill conduit, etc. For this purpose it will be seen that the cartridge unit 8 has its head end provided with a suitable anchorage flange 11 (that desirably is triangular in configuration) for securement by suitable means, such a stud bolts 12, to the end of the casing structure 5 about the mouth of the receptive socket 7.

The embodiment of the relief valve unit or cartridge 8 that is shown in FIGS. 2 and 3 comprises an elongated outer housing which includes a tubular sleeve 13 having a longitudinal bore 14 extending axially therethrough. This housing sleeve 13 has an inlet end 15, and its opposite end 16 preferably is provided with external threads threadably to mount thereon, as a part of the housing means, a cap structure 17 which carries the anchoring flange 11. The housing sleeve 13 and the cap structure 17 are respectively provided with annular channels 18 and 19 in which are seated suitable gasketing means or assemblies 20 and 21 (FIG. 1). Each gasketing assembly may include an elastic O-ring seal flanked on opposite sides by an anti-extrusion ring (which may be in the form of a split ring of flexible plastic of suitable hardness) to assure fluid-tight closure of the annular outlet chamber 9.

The bore 14 of the cylindrical housing sleeve 13 is counterbored from the end 16, at 22, to provide an annular step or abutment shoulder 23. Through this counterbored portion 22 of the sleeve 13 is inserted a part of a transverse partition means which is in the form of an inner housing 24 that has a tight fit within the bore 14 and is provided with an enlarged head 25 that seats against the annular shoulder 23. The housing 24 preferably is provided with an annular channel 26 in which is seated a suitable sealing assembly in the form of an annular elastic O-ring 27 flanked on opposite sides by an anti-extrusion ring 28. The inner housing 24 is provided with a valve orifice circumscribed by a sharp edged valve seat 29 which serves as the mouth of an elongated socket 30 having a downstream guidance section 31 and an intermediate section 32 intervening this guidance section and the valve seat, with the downstream end of this socket being closed off by a transverse wall 33.

An elongated poppet valve member 34 is reciprocatively mounted in the socket 30 and includes, as the down stream end thereof, a valve head 35 and a stem having an upstream piston section 36 reciprocatively mounted in the socket guidance section 31 with a relatively close fit, such as by suitable intervening gasketing means 37 which may also be in the form of an O-ring flanked by suitable anti-extrusion rings, previously described. The left end of the bore 14 of the housing sleeve 13, as viewed in FIGS. 2 and 3, is designed to serve as the inlet passage which is suitably communicated to the pressurized liquid in the hydraulic system, and the piston section 36 of the poppet valve member 34 is isolated from the liquid pressure in this inlet by the sidewall and the closing transverse end wall 33 of the socket guidance section 31. The stem of the poppet valve member 34 has an intermediate section 38 of reduced diameter which intervenes the piston section 36 and the valve head 35. This intermediate stem section 38 is coaxially arranged in the socket intermediate section 32 and is spaced annularly inward thereof to provide an intervening, valved pressure chamber 39 in which inlet liquid pressure is applied to the downstream end 40, which is preferably frusto-conical as shown, of the valve head when the latter is seated against the valve seat 29 in its valve-closing position illustrated in FIG. 2.

The initial section of the housing bore 14, which serves as the inlet of the valve unit 8, is communicated by way of at least one flow or supply passage or duct 41 which extends through the inner housing 24 to communication with the valved pressure chamber 39. Preferably an annular array of a plurality of such supply ducts are provided which desirably are circumferentially spaced equal distances apart, and twelve such supply ducts have been found to be useful in an operative model. It will be seen from FIGS. 2 and 3 that such supply ducts 41 bypass the socket guidance section 31 to obtain the desired isolation of the guided piston section 36.

It will further be seen from FIGS. 2 and 3 that the intermediate section 32 of the socket 30 is provided by a centerbore in the mouth of the latter so that the diameter thereof and of the valve seat 29 at its mouth is appreciably greater than the diameter of the guidance section 31. Consequently, the annular back face 42 of the valved pressure chamber 39, which circumscribes the reduced diameter stem section 38, is of appreciably less pressure effective area than the upstream end of this chamber which is defined about this reduced diameter stem section by the frusto-conical back end 40 of the valve head 35 and the annular valve seat 29 in which head end 40 is exposed, so that the pressure of the inlet liquid which is supplied through the ducts 41 to this valved pressure chamber imposes upon the back end of the valve head a differential pressure for cracking the valve or initially lifting the valve head from the valve seat. This results from the fact that the pressure in chamber 39 acts against all surfaces defining its walls, including the annular surfaces 42 and 40. Since the effective area of annular surface 42 is in a transverse plane less than the effective area of annular surface 40 in a transverse plane the thrust applied by this pressure in a rearward direction in opposition to the forward thrust applied to the exposed back end of the valve head is less to provide the differential forward pressure for imposing a resultant forward thrust to the valve head for lift of the valve head 35 from the valve seat 29.

The transverse partition means, which includes the inner housing 24 also embodies a tubular nozzle or lift ring 43 which has a frusto-conical port 44 the flared sidewall of which is arranged about the valve seat 29. An outer frusto-conical section 45 of the valve head, beyond the frusto-conical back end section thereof which defines the annular surface 40, extends into the flared tubular nozzle port 44 that is annularly arranged about the frusto-conical surface 46 of the valve head, and the included angle therebetween is divergent downstream within a critical range for a purpose to be explained hereinafter.

The counterbore 22 of the housing through bore 14 preferably telescopically receives therein a spacer sleeve 47 with the back end of this sleeve fitted into an annular rabbet 48 provided in the outer face of the lift ring 43. Bore 49 of the spacer sleeve 47 preferably is counterbored from its back end to provide an annular sidewall 50, which defines adjacent the tubular nozzle port 44 an annular outlet zone 149 with which communicates at least one outlet passage or port 141 extending transversely through the housing sleeve 30 and the spacer sleeve 47 to the exterior of the housing of this valve unit 8. In the model of the relief valve of the present invention eight such outlet ports are provided which are arranged in an annular array thereof in which these ports are circumferentially spaced equally.

While the housing sleeve 13 and the spacer sleeve 47 are preferably provided as separate tubular elements functionally they cooperate to define the housing means through which the axial bore thereof extends as a composite of bore sections 14, 50 and 49. The spacer sleeve 47 cooperates with the annular shoulder 23 to anchor in position the transverse partition structure which includes the inner housing 24 and the tubular nozzle or lift ring 43, while also providing by its counterbored portion 50 an annular abutment shoulder 51 to serve as a stop for limiting valve travel, as is hereinafter explained. Desirably, the forward ends of the housing sleeve 13 and the spacer sleeve 47 are provided across their opposed cylindrical surfaces with a longitudinally-extending drill hole 52 in which is seated an indexing pin 53, with this pin and the spacer sleeve held in seated positions by an annular shoulder 54 within the socket 55 of the end cap or fitting 17 when the latter is threadably mounted fully upon the outer end of the sleeve 13. The indexing pin 53 is provided so as to assure alignment of the portions of each of the outlet passages 141 which extend successively through the spacer sleeve 47 and the housing sleeve 13.

The outlet section of the housing structure, that is cooperatively defined by the housing sleeve 13 and spacer sleeve 47 in which is defined the outlet zone 149, preferably is sub-divided by an axially slidable transverse partition structure which segregates the outlet zone from the remainder thereof so that the latter may serve as a head chamber. This axially slidable transverse partition structure preferably is in the form of a cup 56 having a cylindrical sidewall 57 mounted with a close fit for reciprocative movement within the annular counterbored section 50 of the spacer sleeve bore 49. The circular rim 58 of this cylindrical cup sidewall 57 is opposed to the abutment shoulder 51 to serve as cooperative abutment means for limiting the outer travel of cup 56. The central portion 59 of the transverse bottom of the cup 56 projects back toward the outer end of the valve head 35 for cooperative thrust thereby, and the cylindrical outer surface of this projecting cup bottom portion is smoothly merged with a surrounding transverse annular zone 60 of the cup bottom to provide the forward barrier of the outlet zone 149.

The fitting or cap 17 is provided with a stepped bore 61 extending axially therethrough and has an internally-threaded counterbored portion 62 in which may be seated a locking wire coil insert into which is threadably mounted a plug 63. The outer end of this plug 63 preferably is provided with a tool-engaging cross slot 64 for axial adjustment thereof by rotation. A spring abutment member 65 is located adjacent the inner end of the plug so as to be backed by the latter. The axially slidable partitioning cup 56 and the plug 63 cooperatively close off opposite ends of the sleeve bore 49 to define a head chamber 66. Within the head chamber 66 is housed a valve biasing spring 67 which is in the form of a helical compression spring having its active end seated within the cup 56 and its other end seated against the spring abutment member 65. This spring is isolated from flow of the liquid through the valve by the partitioning cup 56. The tension of the spring 67 is adjusted by the axial adjustment of the plug 63 when rotated for threaded advance or retraction.

In order to limit the transmission of biasing force between the poppet valve member 34 and the biasing spring 67 to an axial direction so as to prevent undesirable radial spring movement or tilting, a captured ball 68 is inserted between the opposed outer end of the valve head 35 and the central portion 59 of the spring seating cup 56. Preferably a similar captured ball 69 is inserted between the inner end of the plug 63 and the outer end of the spring abutment member 65.

Space 70 in the bottom of the guidance and poppet-isolating socket 30 is preferably vented to the exterior of the housing structure. For this purpose, as will be seen from FIGS. 2 and 3, an axial bore 71 extends through the poppet valve member 34 to the vicinity of the seat for the thrust ball 68, and a duct 72 is angularly drilled through the valve head for connecting this venting bore to the space between the outer end of the valve head and the back end of the cup extension 59 for venting to the outlet annular chamber 149 and ultimately through the outlet ports 141 to the exterior of the valve housing. It is also desirable to vent the head chamber 66 in which the biasing spring 67 is housed to the exterior of the valve housing, and this may be accomplished to advantage by providing a port 73 through the wall of the spacer sleeve 47 which communicates with a longitudinal channel 74 that leads to one of the outlet ports 141.

In the embodiment of the relief valve illustrated in FIGS. 2 and 3 and the use thereof which is illustrated, by way of example, in FIG. 1 the bore 61 through the fitting 17 which is blocked by the plug 63 also has threadably supported in the outer end thereof a plug 75 which has an externally threaded shank 76 threadably mounted in an internally threaded section 77 of this bore. This bore section 77 of the fitting 17 extends through a neck section 117 thereof that is exposed to the exterior of the casing structure 5 for ready access to the closing plug 75. The shank 76 of the plug 75 has a blind hole 78 which extends axially from its inner end partially through this plug and this hole is in communication with the bore 61. Inward of the outer end 79 of the neck section 117 the hollow plug shank 76 is provided with a transverse venting duct 80 which extends to communication with the blind hole 78, so that fluid in the bore 61 may be vented therefrom when this plug is partially unscrewed to expose the vent hole 80 beyond the neck outer end 79. The plug 63 is provided with one or more venting passages 81 which extend longitudinally therethrough.

This plugging structure provided by inner plug 63 and outer plug 75 is useful to allow measurement of outlet pressure at the venting port 80 in the initial adjustment of the valve unit of FIGS. 1, 2 and 3 to satisfy the maximum pressure requirements of the hydraulic system in which it is installed. While the use of the venting service that is provided by such plugging equipment is not necessary for valve operation thereafter, in view of the venting provided for the spring-housing head chamber 66 by way of port 73 and channel 74 to one of the outlet ports 141, the passage-equipped plug 63 may be used for such service upon removal of the outer plug 75 and connection to the neck 117 of suitable drainage conduit means.

For service operation of the embodiment of FIGS. 1 to 4 incl. let it be assumed that this cartridge type of the relief valve 8 is suitably connected to a certain hydraulic system and that the cracking or initial valve opening pressure of this valve unit has been adjusted by removal of the end plug 75 and threadable translation of the plug 73 to attain the desired biasing of the poppet valve member 34, as a result of the attendant adjustment of the tension of the biasing spring 67. End plug 75 may then be reinserted. The pressure of the liquid in the system is imposed through the casing port 6 and the inlet end of the housing bore 14, through the angular ducts 41 and to the valved pressure chamber 39 for imposition of the force thereof against the frusto-conical back end 40 of the valve head 35. When this pressure reaches the predetermined maximum the thrust applied as a differential force to the back end of the valve head 35 balances out the opposing force that is applied to the outer end of the valve head 35 in the opposite direction by the biasing spring 67 through its seating cup 59 and the intervening captured ball 68. As a result, the increase in differential force which is applying thrust to the poppet valve member 34 causes the latter to travel forward to the valve-open position of FIGS. 3 and 4, the forward travel being stopped by abutment of the cup rim 58 against the annular stop shoulder 51 within the sleeve 47 of the housing assembly. This forward travel or thrust is indicated in FIG. 2 as being the distance X. It will be noted therefrom that the spacing between successive turns of the helical compression spring 67 Y is appreciably greater than the forward travel of the poppet valve member 34 permitted by the stop means 51 and 58, so that these spring turns do not close upon each other to alter the spring characteristics.

When the valve head 35 is thrust forward in this manner to the valve-open position of FIGS. 3 and 4 the space 70 in the bottom of the socket 30 is enlarged to aspirate through the valve head duct 72 and the poppet passage 71 some of the liquid that is discharged from the annular valve port developed by such forward thrust and which is now at a reduced pressure, so that the pressure within the socket back end 70 and that imposed on the valve head 35 within outlet chamber 149 are equalized. Accordingly, there is no development within the socket 30 of an evacuated condition to interfere with free action of the poppet member 34 therein and a differential pressure thrust is not imposed on the back end of the poppet member. When sufficient liquid has been relieved through the open valve to reduce the imposed pressure of the hydraulic system the biasing spring 67 is permitted to return the poppet valve member 34 to its initial valve-closing position with some of the liquid aspirated into the socket space 70 being suitably discharged or the excess thereof relieved through the poppet bore 71 and the relief duct 72 to the outlet zone 149.

When the poppet valve member 34 has been thrust out by such excess of system pressure to the valve-open position of FIGS. 3 and 4 to oppose the frusto-conical surfaces 40 and 46 of the side of the valve head 35 to the flared frusto-conical surface 44 of the nozzle port the intervening annular discharge opening is in the form of a convergent-divergent configuration, with the convergent zone 82 thereof being to the left of the transverse plane Z and the divergent zone 83 thereof being to the right of this transverse plane, as will be seen in FIGS. 3 and 4. The included angle α of the convergent zone 82 may be about 30°, but this is not critical and is largely dependent upon the design as may be dictated by the sizes and shapes of related parts. The included angle β of the divergent section 83 is critical within the range of about 5° to 9° for maximum efficiency, and in the constructed model is about 8.5°, and this assures maximum recovery of head loss through this convergent section. Thus the tendency to turbulence through the annular outlet of the open valve is desirably reduced to a minimum by virtue of the uniform decrease of fluid velocity therethrough. This also assures a high recovery of head loss. The flow through the open valve impinges upon the annular zone 60 of the spring seat cup 56 where the direction of flow is changed in the outlet zone 149 to a transverse direction for discharge through the exhaust outlet ports 141. This flow impingement and change in direction imparts a force upon the spring seat 56 to convert dynamic fluid head to maximum lifting force with minimum pressure increase.

The transmission of thrust from the poppet valve member 34 to the spring seat cup 56 through the captured ball 68 assures that the force transmission is only axial so as to prevent any tendency for the biasing spring 67 to tilt. With the forward thrust of this spring seat cup 56 to reduce the capacity of the head chamber 66 excess of fluid in this head chamber is advantageously vented therefrom by way of the vented port 73 and venting channel 74 to one of the outlet ports 141, and when the pressure of the system is reduced by discharge through the open valve to the predetermined maximum, so as to allow the biasing spring 67 to force the poppet valve member 34 to retract to its valve-closing position, the resulting increase in the capacity of the head chamber 66 is accommodated by aspiration of fluid through this channel and port in the reverse direction.

It is to be understood that while the relief valve construction illustrated in FIGS. 2, 3 and 4 may be preferred, advantages of the present invention may be realized by variations of parts thereof. For example, as is proposed in FIG. 5 the bore 14 of the housing sleeve 113 may be plugged or blocked at its head end by suitable means 217. The transverse partitioning structure 124 which is inserted in the housing bore 14 with a gasketed fit is provided with poppet housing socket 130 which opens up into the larger annular valved pressure chamber 39. This housing socket 130 is initially open at its back end to be counterbored at 85, and this counterbore is closed at its back end by a suitable plug 133 which may be threadably engaged therein to define between it and the back end of the poppet valve member 134 an intervening space 170. The back end section 86 of the piston section 136 of this poppet member extends into the counterbore 85 to provide an intervening annular chamber 87 in which is housed a suitable helical compression spring 167 with its active back end abutted against a nut 88 threadably carried on the tip of this poppet back end section. The front end of spring 167 seats against an annular shoulder 165 defining the forward end of counterbore 85, so that the poppet valve 134 is biased rearwardly by this spring to or toward seating of the valve head 135 in valve seat 29. Fluid communication between the spring housing chamber 87 and the socket space 170 may be had either by making the outer diameter of the nut 88 less than the internal diameter of the counterbore 85 or by one or more notches or flats provided in or on the circumferential surface of this nut to avoid a flow checking fit to the cylindrical surface of the counterbore 85.

In a radial plane of the transverse partitioning unit or inner housing 124 which intervenes a pair of the inlet ducts 41 the body thereof may be provided with an angular venting duct 89 communicating the socket space 170 with an annular channel 90 defined in the wall of the housing bore 14 for communication with the latter in any circumferential position of the outlet end of this duct. The annular venting channel 90 is suitably vented to the exterior of housing sleeve 113 by a duct communicating through the wall of this housing sleeve from this venting channel.

It will be seen from FIG. 5 that the valve head 135 of the poppet valve member 134 may be elongated beyond the nozzle or lift ring 43 and with its forward end shaped to provide an enlarged, cylindrical end zone 92 having slidable annular guidance within the bore of housing sleeve 147. Rearwardly of this valve cylindrical end zone 92 the annular exterior surface of the valve head 135 is gradually concaved annularly at 93 for smooth mergence with the valve head proper that is circumscribed by the nozzle ring 43, so as to provide a generally frusto-conical mid-section 245 having a concaved annular sidewall terminating adjacent the end zone 92 in an impact annular face 160. The concaved midsection 245 is located adjacent to and beyond the frusto-conical section 145 of the valve head, which corresponds to the frusto-conical valve head section 45 of the FIGS. 1 to 44 incl. embodiment that defines between its annular surface 46 and the frusto-conical surface of the lift ring port 44 an outwardly flared or divergent annular section of the valve port when the valve is in its open position. In the FIG. 5 embodiment the divergent annular section of the valve port is defined between the annular frusto-conical surface of the lift ring port 44 and the opposed, annular frusto-conical surface 146 of the valve head section 145, when the valve is open.

This divergent annular section of the valve port of the FIG. 5 embodiment is opposed to the impact annular face 160 of the valve head 135 to deliver thereagainst the annular jet of the pressurized liquid delivered through the valve port. In the FIGS. 1 to 4 incl embodiment the annular surface 60 of the slidable spring seating cup 56 is opposed to the divergent section 83 of the open valve port, to constitute the impact face against which the delivered annular jet of pressurized liquid impinges, as is evident from FIG. 3. Thus, in both embodiments the force of such impingement is opposed to the biasing force imposed upon the poppet valve member by the biasing spring, i.e., against the slidable cup 56 which provides the seat for the active end of spring 67 and transfers the spring thrust back to the valve head 35 through ball 68 in the FIGS. 1 to 4 embodiment, and against the head 135 of the poppet valve member 134 that is biased readward by the spring 167 in the FIG. 5 embodiment. Accordingly, the velocity head imparted by liquid flow through such embodiments of the valve provide desired maximum lifting force to the poppet valve members thereof with a minimum increase in static pressure rise.

In the FIG. 5 embodiment the annular space between the annular valve head enlargement 92 and the adjacent annular concaved surface 93, and the opposed lift ring 43, constitutes an outlet chamber 249 from which discharge through the open valve is delivered. For this purpose outlet passages or ports 141, extending through the lining sleeve 147 and housing sleeve 113, communicate the annular outlet chamber 249 to the exterior of this housing sleeve. In order to limit the forward travel of the valve member 134 during its opening action any suitable, relatively fixed stop means may be provided in the valve housing for abutment by a portion of the valve member. Such stop means may be located beyond the forward valve end for ultimate abutment by the latter such as a suitable stop projection or an annular stop shoulder. It is proposed in FIG. 5 that the lining sleeve 147 be counterbored to provide for this purpose an annular stop shoulder 94 against which the annular valve enlargement 92 may abut. The length of travel of the poppet valve member 134 which is permitted by the stop shoulder 94 should be less than the space between successive turns of the helical compression spring 167, so as to prevent the successive turns thereof from closing up on each other when the poppet member 134 is thrust forward by pressure on the back end of the valve head 135.

In the FIGS. 1 to 4 and FIG. 5 embodiments the annular surfaces which define the impact faces 60 and 160 are shown to be gradually and smoothly merged by curved surfaces with annular surfaces that are substantially aligned with the annular, frusto-conical valve head surfaces located within the lift ring port 44, so that in the valve open position the flow through the valve port will be smoothly changed from a generally axially direction to a generally transverse or radial direction. This change in direction of the emitted jet supplements the direct impingement against the impact face 60 or 160 to impart the desired maximum lifting force, and the smooth transition of the flow path assures a minimum of turbulence. It will thus be seen that in the embodiment of FIGS. 1 to 4 the biasing means in the form of helical compression spring 67 employs as thrust transferring means, intervening its active portion or end and the valve head 35 the spring seating cup 56 and the intervening thrust transfer ball 68, to urge the valve head back to its valve closing position. Thrust transferring means is also provided for structurally connecting the annular impact face 60 to the valve closing portion 40 of the valve head 35 for axial movement therewith to oppose to the biasing force of the spring the valve lifting force of flow through the open valve that is imposed upon the impact face. In the FIG. 5 embodiment thrust transferring means is provided which intervenes the active portion of end of the biasing spring 167 and the poppet valve means for urging the valve head to its valve closing position, which includes at least the valve seat nut 88. The spring biasing force is then transferred from the nut 88 through the valve stem to the valve head 135 for such urgence to the valve closing position. Thrust transferring means also structurally connects the impact face 160 to the valve closing portion 140 of the valve head 135 for axial movement therewith to oppose to the biasing force of the spring 167 valve lifting force of flow through the open valve that is imposed upon the annular impact face 160. This thrust transferring structural connecting means in the FIG. 5 embodiment is in the form of the frusto-conical section 145 of the valve head which connects it to the section 245 that carries the annular impact face 160.

It will be understood from FIG. 5 that venting of the space 170 in the back end of the socket 130 and the chamber 87 in which the biasing spring 167 is housed will be simultaneously vented through the vent duct 89, the venting channel 90 and the outlet duct 91. Also, in this structure the inlet ducts 41 by-pass this socket 130 and the valve piston 136 reciprocatively mounted therein. The head space beyond the stop shoulder 94 may be vented in any suitable manner, such as by vent passage 173 extending through the bore-plugging member or end cap 217.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

Having described my inventon, what I claim as new and desire to secure by Letters Patent is the novel subjects matter defined in the following claims:

1. A high-pressure hydraulic relief valve of the poppet type comprising, in combination
   (A) elongated outer housing means having a longitudinal bore therein open at one end to serve as an inlet passage;
   (B) transverse partition means sub-dividing the bore into an inlet section and an outlet section, said partition means having a valve orifice in the downstream side thereof circumscribed by an annular valve seat;
   (C) poppet valve means having a head that is thrustable forward from an upstream valve-closing position against said valve seat by predetermined liquid pressure behind said head to lift the latter from said valve seat to a valve-open position;
   (D) biasing means having an active portion urging said poppet valve means back toward its valve-closing position; and
   (E) means defining an outlet passage communicating said outlet section at a point downstream of said valve seat to the exterior of said housing means; wherein the improvement comprises
      (1) said partition means in a form defining upstream of said valve seat a longitudinally-extending, elongated socket having an upstream guidance section and an intermediate section intervening the latter and said valve seat with said guidance section closed off at its upstream end by transverse wall means;
      (2) said poppet valve means in a form to include a stem carrying said head on the downstream end thereof with said stem having an upstream piston section reciprocatively mounted by a relatively close fit in said socket guidance section and isolated from inlet liquid pressure by the sidewall and closing transverse wall means of this socket section;
      (3) the sidewall of said socket intermediate section being arranged about an intermediate section of said stem that intervenes the piston section of the latter and said valve head and spaced annularly from said stem intermediate section to provide an intervening, valved pressure chamber in which inlet liquid pressure is applied to the upstream end of said valve head when the latter is seated against said valve seat in its valve-closing position to thrust said poppet valve means forward to its valve-open position;
      (4) means defining a flow supply passage communicating said inlet passage directly to said valved pressure chamber with this supply passage by-passing said socket guidance section; and
      (5) means embodied in said partition means defining about the downstream side of said valve seat a tubular nozzle port directly communicating said valve seat to said outlet section and into which said valve head extends in its forward valve-open position with the sidewall of said port and the opposed side surfaces of said valve head being relatively shaped to provide in the valve-open position of said poppet valve means an intervening annular valve port passage that has an intial upstream converging section and a following downstream diverging section together providing a convergent-divergent nozzle configuration.

2. The relief valve of claim 1 in which said valve seat is of greater transverse dimension than that of said socket for application of valve opening fluid pressure to the back end of said valve head exposed to the interior of said valved pressure chamber within the effective area of said valve seat when closed by said valve head, and means venting the space in said socket behind said poppet valve piston directly to the exterior of said housing means.

3. The relief valve of claim 2 in which said venting means is in the form of a passage extending longitudinally and successively through said poppet valve stem and head into communication with said outlet section beyond said valve seat.

4. The relief valve of claim 1 in which the biasing means is in the form of a spring having an active end associated with said poppet valve means to apply retroactive thrust to said valve head for seating the latter, and in which provided encompassing wall means within said housing means that surrounds said spring and isolates it from flow of pressurized liquid through this valve structure.

5. The relief valve of claim 4 in which said biasing spring is in the form of a helical compression spring having the successive turns thereof spaced a predetermined distance apart, and stop means are provided to limit the forward travel of said poppet valve means from the valve-closing position to the valve-open position to a distance less than the spacing apart of the successive turns of said spring whereby the successive spring turns will not be closed up on each other by the forward valve travel.

6. The relief valve of claim 5 in which said stop means is in the form of a relatively fixed abutment means carried by said housing means and axially movable abutment engaging means associated with said poppet valve means for axial movement with the latter.

7. The relief valve of claim 6 in which said abutment engaging means is in the form of an axially slidable transverse partition means located in said outlet bore section and spaced forward from said tubular nozzle means together defining therebetween an annular outlet zone adjacent the latter with the outlet passage being in the form of a side port communicating this outlet zone directly to the exterior of said housing means through the sidewall of the latter, the forward end of said bore being blocked by relatively fixed means, the spring encompassing wall means being in the form of a closed head chamber defined between said slidable partition means and said blocking means with this chamber being isolated by said slidable partition means from flow of liquid through said tubular nozzle means and the outlet zone and side port, the outer end of said valve head being opposed to the central portion of the back side of said slidable partition means for forward thrust of the latter to engagement of said relatively fixed abutment means for limiting valve-opening travel of said valve head, said valve biasing compression spring being located in said head chamber with its active end seated against the chamber side of said slidable partition means and its other end being backed by said bore plugging means, and in which means are provided that defines a venting passage communicating said head chamber to the exterior of said housing means on the downstream side of said valve seat.

8. The relief valve of claim 7 in which said relatively fixed abutment means is in the form of an annular shoulder facing toward said tubular nozzle means and said slidable partition means is in the form of a cup having an annular sidewall slidably mounted with a relatively close fit within the bore and a transverse bottom serving as the central portion of said slidable partition means that is opposed to the outer end of said valve head for application of the forward thrust by the latter, said cup sidewall having an annular rim opposed to said annular shoulder to serve therewith as said stop means.

9. The relief valve of claim 8 in which is provided a captured ball interposed between the opposed central portions of said cup bottom and said valve head limiting transmission of force from said valve biasing spring to said poppet valve means to axially directed force.

10. The relief valve of claim 9 in which is provided a transverse spring abutment member between said bore blocking means and the opposed end of said valve biasing spring with another captured ball interposed between the opposed central portions of said blocking means and spring abutment member.

11. The relief valve of claim 10 in which said bore blocking means is in the form of a plugging member that is axially adjustable to adjust the tension of said valve biasing spring, and said venting passage for said head chamber is in the form of a duct extending from the latter through the sidewall of said housing means to communication with the outlet side port.

12. The relief valve of claim 1 in which is provided beyond the downstream divergent section of the annular valve port passage an opposed and axially movable annular impact face for impingement thereagainst of flow through the valve in the open position of the latter, thrust transferring means intervening the active portion of said biasing means and said poppet valve means for urging said valve head to its valve closing position, and thrust transferring means structurally connecting said impact face to the valve closing portion of said valve head for axial movement therewith to oppose to the biasing force of said biasing means valve lifting force of flow through the open valve that is imposed upon said impact face.

References Cited
UNITED STATES PATENTS

| | | | |
|---|---|---|---|
| 2,134,803 | 11/1938 | Rose | 137—469 |
| 2,680,447 | 6/1954 | Groves | 137—469 XR |
| 3,917,072 | 12/1959 | Saville | 137—469 |

HAROLD W. WEAKLEY, Primary Examiner

U.S. Cl. X.R.

137—484.2, 514.7

PO-1050
(5/69)

UNITED STATES PATENT OFFICE
CERTIFICATE OF CORRECTION

Patent No. 3,472,274          Dated October 14, 1969

Inventor(s) John M. Fettke

It is certified that error appears in the above-identified patent and that said Letters Patent are hereby corrected as shown below:

Column 1, line 49, for "intervere" read --interfere--; column 2, line 58, for "back of" read --back end of--; column 3, line 42, for "desirable" read -- desirably --; column 4, line 39, for "acccom-" read -- accom --; column 4, line 61, for "basing" read -- biasing --; column 5, line 6, for "a" read -- as --; column 7, line 35, for "plug so" read -- plug 63 so --; column 10, line 39, for "44" read -- 4 --; column 10, line 65, for "readward" read -- rearward --; column 11, line 9, for "latter" read -- latter, --; column 11, line 48, for "of" (first occurrence) read -- or --; column 12, line 74, for "intial" read -- initial --; column 13, line 21, for "which provided" read -- which is provided --; column 14, line 55, for "3,917,072" read -- 2,917,072 --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents